(12) United States Patent
Pozin

(10) Patent No.: US 8,408,160 B1
(45) Date of Patent: Apr. 2, 2013

(54) PET WASTE CONTAINMENT SYSTEM

(75) Inventor: Mitchell E. Pozin, St. Petersburg, FL (US)

(73) Assignee: Mitchell Pozin Consulting, LLC, St. Petersburg, FL (US)

(*) Notice: Subject to any disclaimer, the term of this patent is extended or adjusted under 35 U.S.C. 154(b) by 0 days.

(21) Appl. No.: 13/595,262

(22) Filed: Aug. 27, 2012

(51) Int. Cl.
*A01K 29/00* (2006.01)

(52) U.S. Cl. .............. 119/170; 4/484; 53/567; 53/576

(58) Field of Classification Search .......... 119/161–170; 220/908.3, 908.1, 908, 495.08, 495.06; 53/567, 53/576; 4/484, 483, 479
See application file for complete search history.

(56) References Cited

U.S. PATENT DOCUMENTS

| | | | |
|---|---|---|---|
| 3,536,192 A * | 10/1970 | Couper | 206/303 |
| 3,665,522 A * | 5/1972 | Backlund et al. | 4/484 |
| 3,735,735 A | 5/1973 | Noroian | |
| 3,908,336 A * | 9/1975 | Forslund | 53/576 |
| 4,011,837 A | 3/1977 | Ksioszk | |
| 4,025,969 A * | 5/1977 | Dahlen | 4/484 |
| 4,299,190 A | 11/1981 | Rhodes | |
| 4,376,365 A | 3/1983 | Moertel | |
| 4,465,018 A | 8/1984 | Mopper | |
| 4,519,104 A * | 5/1985 | Nilsson | 4/484 |
| 4,787,334 A | 11/1988 | Bassine | |
| 5,156,640 A | 10/1992 | Del Rosario | |
| 5,592,900 A | 1/1997 | Kakuta | |
| 6,052,842 A * | 4/2000 | He | 4/484 |
| 6,205,954 B1 | 3/2001 | Bogaerts | |
| 6,615,765 B1 * | 9/2003 | Thomas | 119/165 |
| 6,662,748 B1 | 12/2003 | Hanks | |
| 6,827,035 B2 | 12/2004 | Manera | |
| 6,974,029 B2 * | 12/2005 | Morand et al. | 206/303 |
| 6,994,247 B2 * | 2/2006 | Richards | 232/43.1 |
| 7,107,933 B2 * | 9/2006 | Mohr | 119/166 |
| 7,958,846 B2 | 6/2011 | Axelrod et al. | |
| 2003/0230579 A1 * | 12/2003 | Chomik et al. | 220/495.1 |
| 2006/0169214 A1 * | 8/2006 | Turkalo | 119/165 |
| 2007/0056520 A1 | 3/2007 | Hamada | |
| 2009/0241850 A1 | 10/2009 | Campbell et al. | |

FOREIGN PATENT DOCUMENTS

JP 56052124 A * 5/1981
US WO9610907 4/1996

* cited by examiner

*Primary Examiner* — Kristen C Hayes
(74) *Attorney, Agent, or Firm* — Nilay J. Choksi; Smith & Hopen, P.A.

(57) ABSTRACT

A secure pet waste containment system utilizing an automated gear, roller and spool assembly to secure pet waste on all sides and store them for future disposal. A housing includes an aperture in its top side into which a pet, typically feline, would deposit waste. The aperture and space thereunder is lined with bagging that has its source from a bag cartridge disposed around the circumference of the aperture. When waste has been deposited, the lining secures the waste on all sides by traversing a series of rollers until the lining is wound within a circular spool. As this is occurring, the bag cartridge automatically releases more bagging into the aperture and space thereunder for subsequent deposit of pet waste.

12 Claims, 9 Drawing Sheets

PET WASTE CONTAINMENT SYSTEM

BACKGROUND OF THE INVENTION

1. Field of the Invention

This invention relates, generally, to pet waste disposal. More particularly, it relates to a safe and automated apparatus for receiving and securing pet waste.

2. Description of the Prior Art

Pet waste, in particular that of felines, is burdensome for owners in having to clean and be exposed to the waste multiple times per day. The most popular conventional art tends to range from litter boxes to training a cat to use a toilet. Attempts, however unsuccessful, have also been made to provide an apparatus that secures pet waste in a manner such that the pet waste does not need to be cleaned as many times as just using a conventional litter box.

U.S. Pat. No. 4,376,365 to Moertel discloses an animal waste containment or disposer unit that includes a dish shaped area where an animal would dispose its waste. The dish shaped area is covered by a lining sheet. When the animal departs or is removed from the device, a second sheet is automatically disposed over top the first lining sheet, and the sheets are sealed to each other to enclose the waste material. The sealed sheets with enclosure can be removed via a cutting mechanism on the device or can be wound upon a reel for storage until subsequent removal. An animal deposits waste on the device in a particular area, the waste is sealed within a bagging, and the waste can be spun around a reel for storage.

PCT patent pub. No. WO/1996/010907 to Battistin describes sanitary hygienic device for the collection of waste from a pet, in particular a cat. Battistin teaches simple use of a receptacle that fits beneath a planar surface that has a hole in it leading into the receptacle. The receptacle may be lined with bagging and contains litter. Thus, after a cat has deposited waste material into the receptacle, the user can collect the bag and throw it into the garbage.

U.S. Pat. No. 5,156,640 to Del Rosario discloses a conveyor that captures and secures waste in a take-up roller. The idea is that a horizontal conveyor made of Saran Wrap® sheet material would capture the waste material of a pet, such as a bird, and would feed from a first roller to a second roller and subsequently into a take-up roller underneath the second roller. The take-up roller receives the Saran Wrap and secures the waste material within the layers.

U.S. Pat. No. 6,827,035 to Manera discloses a self-refreshening litter box that uses a conveyor to set and dispose of a continuous litter material. The litter material is "rolled out" into the surface onto which the pet would deposit its waste material. Thereupon, the litter material traverses through a series of gears to flatten it out and can be collected and secured in a spool.

U.S. Pat. No. 7,958,846 to Axelrod et al. discloses an apparatus using a feed roll and take-up roll coupled by an absorbent pad. The animal would deposit waste materials on the pad, and the pad would then traverse into the take-up roll. The pad includes a surface sealing feature, such that when the top surface of the pad contacts the bottom surface of the pad (on the take-up roll), the surface sealing feature produces a seal for the waste deposit therein.

U.S. patent app. pub. No. 2009/0241850 to Campbell et al. discloses a pet waste collection system that has a floor that receives pet waste on a film. The film is connected on one end of the floor to a wrapper cartridge and on the other end of the floor by a spool. The wrapper cartridge feeds film onto the floor, an animal deposits waste on the film, a sensor detects that the animal has left the device, and the spool automatically receives the film with waste. The spool secures the film and waste until replacement is needed.

U.S. Pat. No. 3,735,735 to Noroian discloses a portable commode for pets that essentially includes a tray covered by sand or sawdust (possibly litter) and an aperture leading to a bag at the end of the tray. A pet would simply deposit waste on the tray, and the user could rake the waste deposit into the bag through the aperture.

U.S. Pat. No. 4,299,190 to Rhodes discloses an animal litter box wherein the operation is enabled by a pet depositing waste into a bag, which is contained within a 180° rotatable housing to facilitate sealing and removal of the bag.

U.S. Pat. No. 4,465,018 to Mopper discloses a platform lined with a film and litter, upon which a pet can deposit waste. The film is connected on either side of the platform by a feed roller and take-up spool. When the pet has deposited waste, the feed roller feeds more film onto the platform as the used film is received by the take-up spool and rolled up. As the film is being rolled up into the spool, the waste and litter fall into a mesh screen to facilitate disposal. The apparatus further includes a hopper that feeds more litter onto the film as the film traverses along the platform.

U.S. Pat. No. 4,787,334 to Bassine discloses a platform lined with a film and litter, upon which a pet can deposit waste. The film is connected on either side of the platform by a feed roller and take-up spool. When the pet has deposited waste, the feed roller feeds more film onto the platform as the used film is received by the take-up spool and rolled up. The apparatus further includes a hopper that feeds more litter onto the film as the film traverses along the platform.

U.S. Pat. No. 5,592,900 to Kakuta discloses an automated portable pet toilet that is capable of separating liquid and solid waste and storing them separately for later storage. The apparatus includes a platform lined with a film and litter, upon which a pet can deposit waste. Liquid waste falls through apertures within the platform and is funneled into a liquid waste reservoir. Solid waste traverses with film via a series of gears and rollers. As the film is rolled into a spool, the solid waste falls into a solid waste reservoir.

U.S. Pat. No. 6,662,748 to Hanks discloses a litter box apparatus that essentially includes a container with an aperture in its top and a plurality of structures underneath the aperture. The apparatus would be laid on its side, a pet would climb through the aperture on the support structures and into the container that is lined with a bag and contains litter.

Though these attempts have been made, problems still exist, in particular ease of manufacture, ease of use, securement of the pet waste immediately upon deposit, continuous single bagging feeding into the system and wholly covering the pet waste as it is fed into the spool, among other problems associated with the conventional art.

Accordingly, what is needed is a pet waste containment system that is capable of fully covering the pet waste upon deposit and feeding the covered pet waste into a spool for easy replacement. However, in view of the art considered as a whole at the time the present invention was made, it was not obvious to those of ordinary skill how the art could be advanced.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

The long-standing but heretofore unfulfilled need for an improved, more secure and more efficient pet waste containment system is now met by a new, useful and nonobvious invention.

An embodiment of the current invention is a pet waste containment system. The system comprises a housing with exterior sides, including a top side in which an aperture is formed. A bag cartridge is disposed within a cartridge slot along the outer circumference of the aperture, such that the inner diameter of the cartridge slot is larger than the diameter of the aperture. The bag cartridge contains bagging, wherein the leading end of the bagging and trailing end of the bagging are connected via the remainder of the bagging. An annular wall is disposed underneath the aperture, and a tubing is disposed proximal thereto. The tubing has a smaller diameter than the aperture. The bagging is released from the cartridge into the aperture and is directed down the annular wall into the tubing. Within the tubing are one or more rollers having a gibbous shape, so that the bagging can follow a line of path through the rollers as the rollers are rotating. A circular rotating spool is disposed near the rollers, and the bagging is constrained to a line of path to the spool and is wound around the spool. Thus, pet waste can be deposited into the aperture, enclosed by the bagging and travel through the rollers until it is securely wound around the spool.

The system may further include a digital counter on an exterior surface of the housing. The digital counter displays the length of bagging remaining in the bag cartridge. One or more reset lugs may extend from the bag cartridge, and one or more reset switches may be positioned within the cartridge slot. Therefore, when a new bag cartridge is placed into the cartridge slot, the reset lugs contact the reset switches, transmitting an electrical signal to reset the digital counter.

The system may further include an upper lid that is disposed atop the housing and has an aperture formed therein that aligns with the aperture of the housing.

The system may further include a tray insert disposed within the aperture of the housing. The tray insert has a base that lies below the aperture and has a diameter similar to a diameter of the aperture.

The bag cartridge may contain the bagging in folded layers.

The system may further include a funnel-shaped structure disposed underneath the aperture. The cup of the funnel-shaped structure constrains the bagging to a line of path into the tubing.

The vertical inner wall of the bag cartridge can form the annular wall underneath the aperture.

The system may further include one or more gears coupled and corresponding to the rollers to drive the rotation of the rollers. In a further embodiment, the system may further include one or more counter trigger gears interlocked with the gears to drive the rotation of the gears.

Each roller can have a rounded portion in tangential contact with a wall of the tubing. The contact provides friction between the roller and the wall in order to maintain a continuous vent seal and slow or stop rotation of the roller.

The system may further include a motion sensor disposed along the top surface of the housing. The motion sensor is in electrical communication with the rollers. A delay timer is also included and in electrical communication with the motion sensor and the rollers. When the pet departs the system, the delay timer delays sending an electrical signal for a predetermined amount of time from the motion sensor to the rollers.

In a separate embodiment, the current invention may include one or more of the foregoing limitations, individually or in combination.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which.

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

Figure 1:
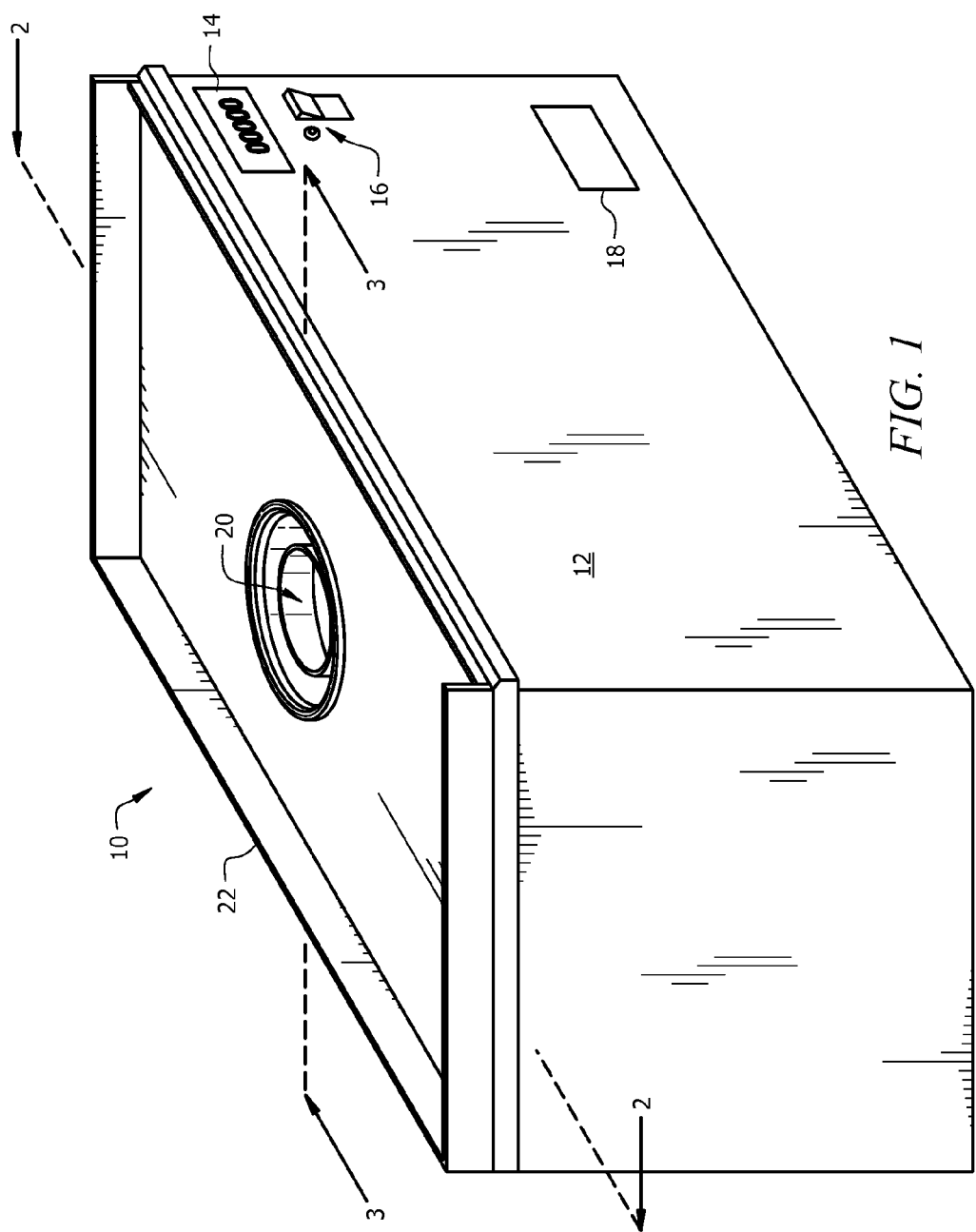
FIG. 1 is a perspective view of the exterior of a pet containment system with upper lid.

FIG. 1 depicts the exterior of a litterless pet containment system 10 with upper lid 22 disposed in overlying relation and contiguous to system frame 12. System frame 12 is substantially impermeable and rigid, and can be formed of any suitable natural or synthetic material. System frame 12 is depicted in FIG. 1 as having a rectangular shape, though other functional and aesthetic shapes are envisioned. System frame 12 further includes a battery or A/C adapter port 18, power switch or on/off indicator 16, and digital counter 14.

Upper lid 22 has a planar floor disposed parallel to the surface upon which system 10 is placed. The planar floor may have raised edges but must leave at least one edge substantially flat or raised very little, for example one inch, so a pet may climb atop lid 22. Lid 22 can be removed to reveal the interior of frame 12. In this way, components within the interior (e.g., bag cartridge 30, bagging 32, spool 40, etc.) can be accessed. Lid 22 and frame 12 have apertures 20 along their top surfaces that align and lead into the interior of system 10. Port 18 on frame 22 is designed to receive a battery (not shown) or A/C male plug (not shown) or other known conventional power source. Power switch 16 is a conventional switch or indicator that indicates whether system 10 is receiving power or is in an off or standby position. Counter 14 counts the number of units (e.g., feet) of bagging remaining in bag cartridge 30. Counter 14, along with its functionality, is disclosed in fuller detail below.

Figure 2:
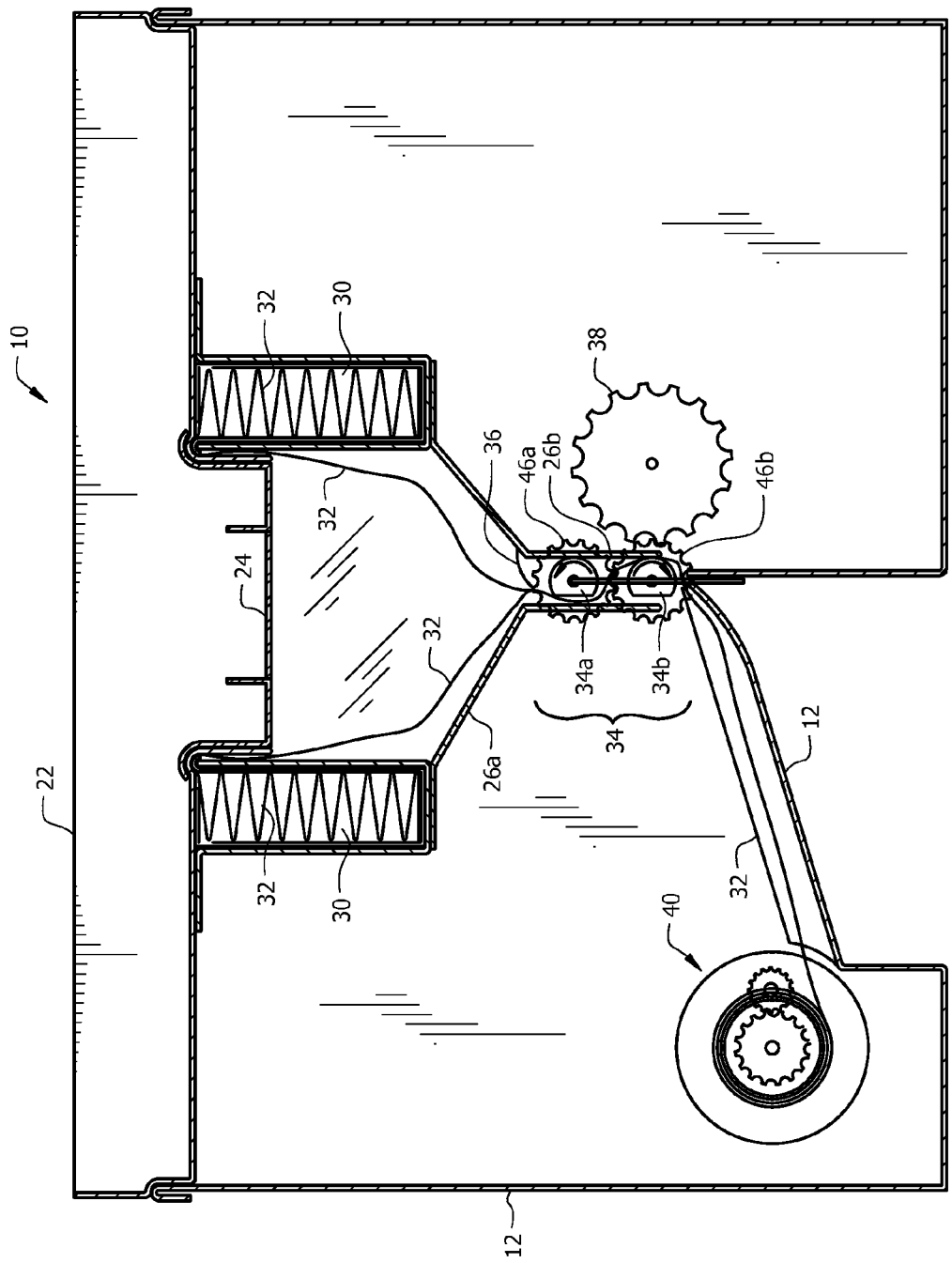
FIG. 2 is a longitudinal cross-sectional view taken along line 2-2 in FIG. 1.
Figure 3:
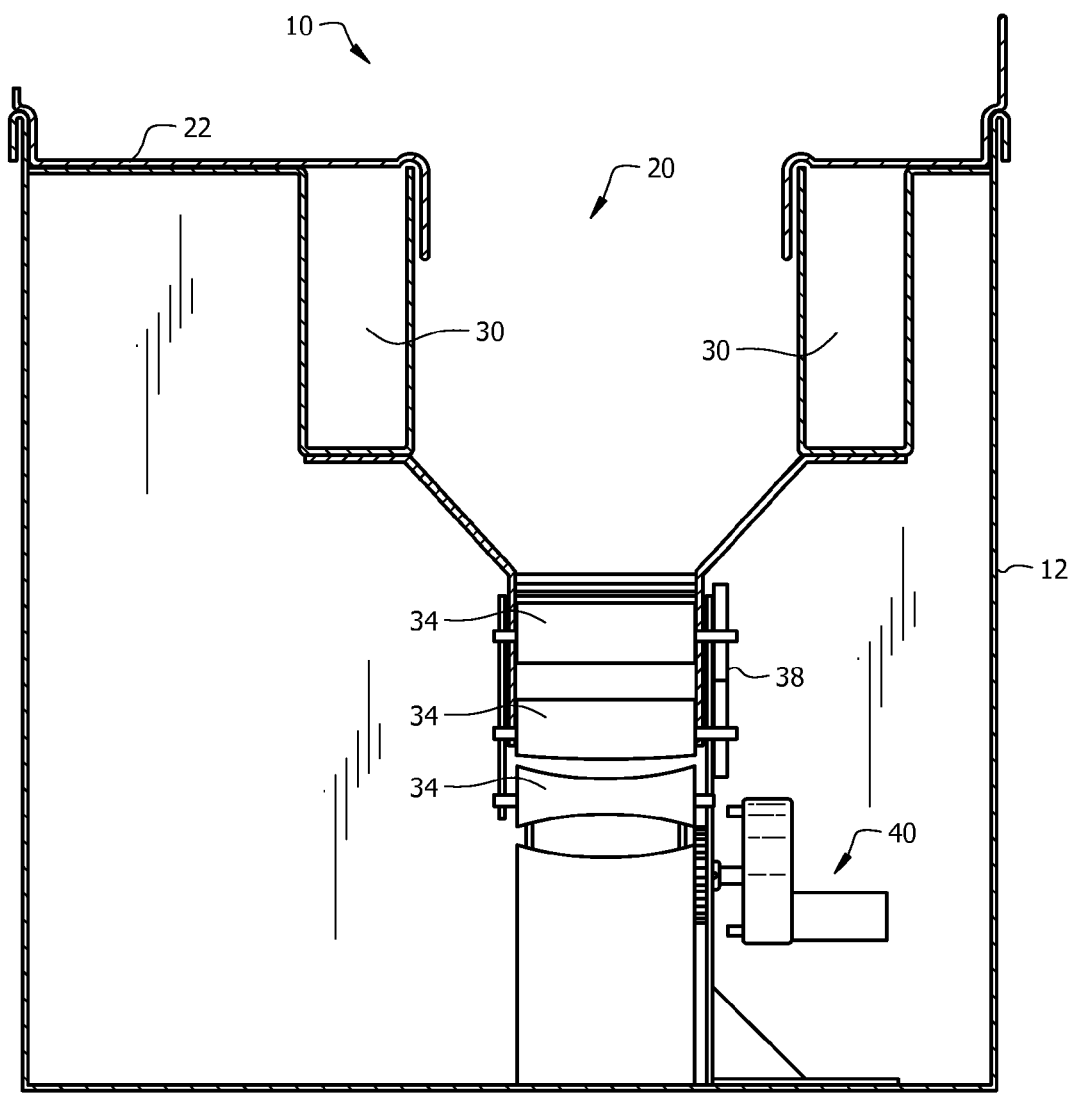
FIG. 3 is a transverse cross-sectional view taken along line 3-3 in FIG. 1.

A cross section along axes (i.e., longitudinal and transverse axes) of system 10 is depicted in FIGS. 2 and 3. FIGS. 2 and 3 are depicted with frame 12, upper lid 22, and training tray insert 24, though as a feline is trained to use system 10, upper lid 22 and tray insert may be removed, leaving frame 12 with aperture 20 therewithin leading to the interior of system 10.

Figure 4:
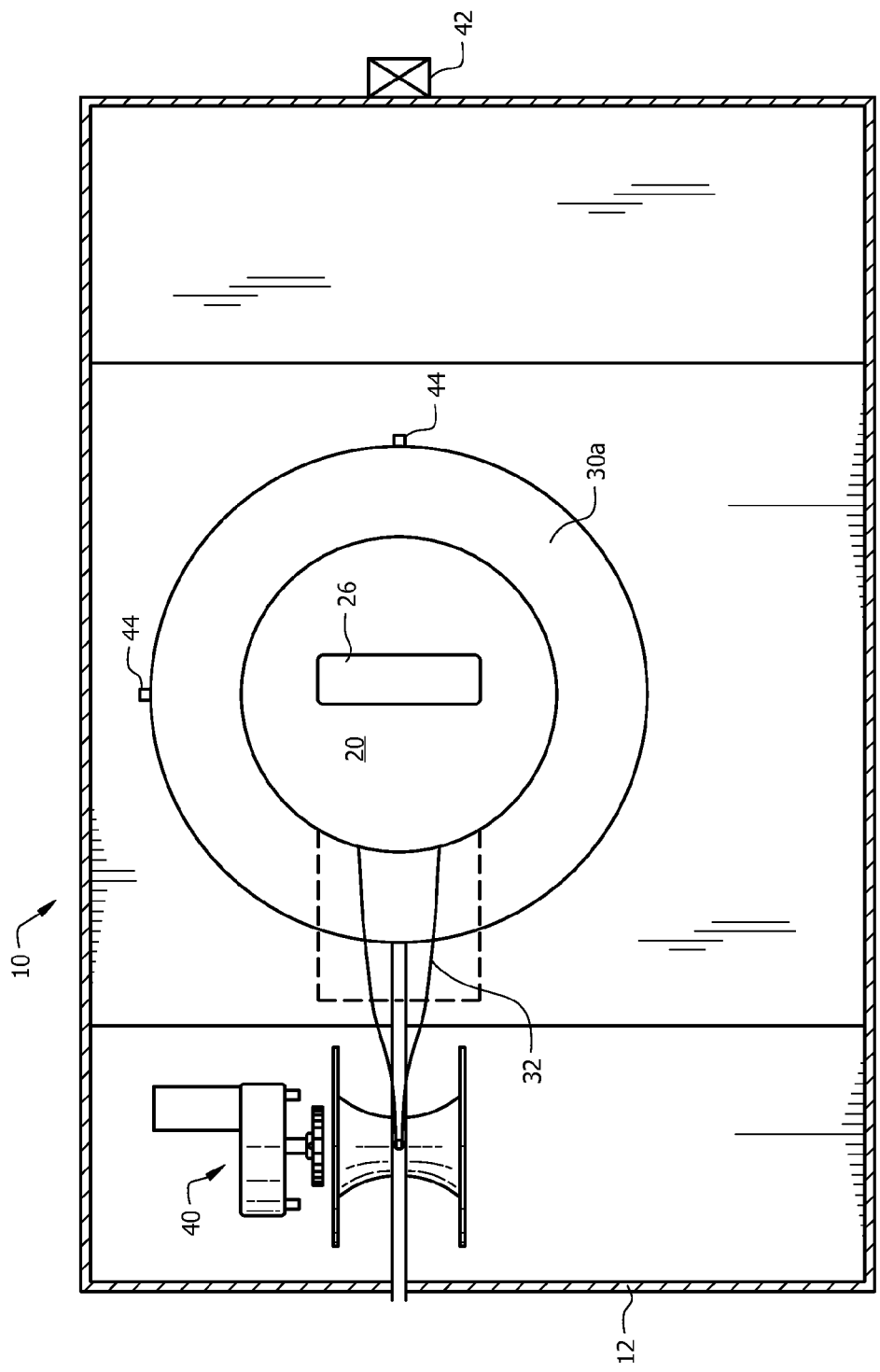
FIG. 4 is a top view of a pet containment system with upper lid removed.

Bag cartridge 30 is annular and contained within the interior of system 10 along the outer circumference of aperture 20, as disclosed in FIG. 4. The top edge of bag cartridge 30 lies substantially along the top edge of frame 12, as disclosed in FIGS. 2 and 3, such that the top edge of bag cartridge 30 lies adjacent to aperture 20. Bag cartridge 30 has a cylindrical shape with open top, open bottom, and hollow interior. The walls of cylinder-shaped bag cartridge 30 are thick enough to contain bagging 32 therewithin. Thus, bag cartridge 30 may have any height and width sufficient to contain bagging 32.

Bagging 32 is displaced from bag cartridge 30 into aperture 20 via conventional rotary motors (not shown) and other suitable means. The vertical interior wall of bag cartridge 30 can serve as an interior wall within system 10 beneath aperture 20. As bagging 32 enters aperture 20, bagging 32 lines or is pulled taut in overlying relation to the vertical interior walls beneath aperture 20. Funnel structure 26a, 26b extends from the bottom of the vertical interior walls beneath aperture 20 (i.e., bottom interior edge of bag cartridge 30). Cup 26a of the funnel structure serves to direct bagging 30 toward the center of cup 26a approaching tube 26b of the funnel structure. Cup 26a of the funnel structure narrows at its bottom-most peak toward tube 26b of the funnel structure. Thus, bagging 32 is circumferentially compressed into tube 26b.

Disposed within tube 26b of the funnel structure is a series of rollers 34 and one or more flanges 36 for directing bagging 30 through said series of rollers 34. As seen in FIG. 2, series of rollers 34 has a semicircular or gibbous shape, as flow of the waste-contained bagging 32 is allowed along the rotating flat portions of rollers 34. As bagging 32 approaches first roller 34a, the flat portion of first roller 34a faces and is substantially parallel to a wall of tube 26. Thus, bagging 32 (potentially enclosing deposited pet waste) may flow between the flat portion of first roller 34a and the wall of tube 26b. Bagging 32 is then directed between first roller 34a and second roller 34b. Rollers 34a, 34b rotate such that the flat portions of first rollers 34a and second roller 34b face each other but do not abut, as the space between the facing flat portions of rollers 34a, 34b allow bagging 34 to traverse said space toward the opposite wall of tube 36b. As bagging 32 approaches the opposite wall of tube 26b, second roller 34b rotates until the flat portion of second roller 34b faces and is substantially parallel to that opposite wall. Thus, bagging 32 is directed to flow between the flat portion of second roller 34b and the opposite wall of tube 26b. Finally, upon traversing second roller 34b, bagging 32 is directed to circulating rotating spool or collection duct 40.

To facilitate this path of travel across rollers 34, one or more flanges 36 can be disposed above, between, or below rollers 34 to direct bagging 32 along and around rollers 34. Additionally, as seen in FIG. 2, frame 12 may be bent along its lower portion, such that the apex of said bend can be disposed proximal to second roller 34b to function as an additional flange directing bagging 32 towards spool 40. Rollers 34 may also contain a series of teeth (not shown) that would help direct bagging 32 along its line of path to spool 40.

The rotation of rollers 34 can be achieved in any controlled manner to maintain or control the flow of bagging 32. Generally, adjacent rollers (e.g., rollers 34a, 34b) should rotate in opposite directions. Thus in the current illustration, first roller 34a rotates counterclockwise and adjacent second roller 34b rotates clockwise. If a third roller was present under second roller 34b, it might rotate counterclockwise so that bagging 32 could traverse the space between the second and third rollers and past the third roller. Speed and control of rotation may be preset so that the flat portions of rollers 34 are correctly positioned at the appropriate time as bagging 32 flows. For example, one or more gears (e.g., gears 46a, 46b) may be positioned along rollers 34 to drive and shut off rotation of rollers 34. As another example or in combination with the previous example, a conventional motor (not shown) may drive rollers 34, and the circular portion of rollers 34 may each have tangential contact with one wall of tube 26b, as seen in FIG. 2. This tangential contact provides friction between rollers 34 and tube 26b, said friction providing a continuous vent seal and shutoff point upon rotation of rollers 34. Rollers 34 may be actuated via the continuous friction of bagging 32 being pulled by spool 40, rather than being directly driven by a motor.

Counter trigger gear 38 may be positioned to drive gears 46a, 46b, which in turn facilitate rotation of rollers 34. FIG. 2 depicts counter trigger gear 38 in communication with gear 46b, and gear 46b in communication with gear 46a. Thus, a motor (not shown) may cause the rotation of counter trigger gear 38, in turn rotating gears 46a, 46b and thus actuating rollers 34a, 34b. Alternatively, if no motor is present, gears 46a, 46b are present to maintain proper synchronization of rotation of rollers 34.

As bagging 32 flows from aperture 20 through roller 34b, bagging 32 becomes taut and secures deposited pet waste (not shown) on all sides of the pet waste. Thus, the pet waste cannot move or separate from bagging 32 as bagging 32 travels and winds around spool 40. Any suitable spool can be utilized as long as bagging 32 containing pet waste can be tightly wound about the spool. Spool 40 must also be suitable for complete removal from system 10 or for compact removal of bagging 32 from spool 40. Once spool 40 contains a saturated amount of bagging 32 or once bag cartridge 30 has a low amount of bagging 32 remaining or runs out of bagging 32, spool 40 should be removed, or bagging 32 should be removed from spool 40. Regardless of the methodology, when the bagging needs to be replaced, the used bagging should ultimately be disposed of or recycled, and new bagging should be arranged within bag cartridge 30 and system 10 for use. It is contemplated that new bagging can be placed the bag cartridge or an entirely new cartridge containing bagging can be placed into the system. The cycle of disposing bagging 32 into aperture 20 then repeats.

Alternatively, when bagging 32 is running low (as can be determined from digital counter 14), bagging 32 can be cut and a new bag cartridge can be inserted, wherein the new bagging is tied or otherwise coupled to bagging 32. Thus, system 10 can continue to operate smoothly. Alternatively, when spool 40 becomes filled or saturated with bagging 32, bagging 32 can be torn and the portion wound around spool 40 can be discarded. Thus, system 10 can continue to operate smoothly with the remaining bagging 32.

Figure 5A:
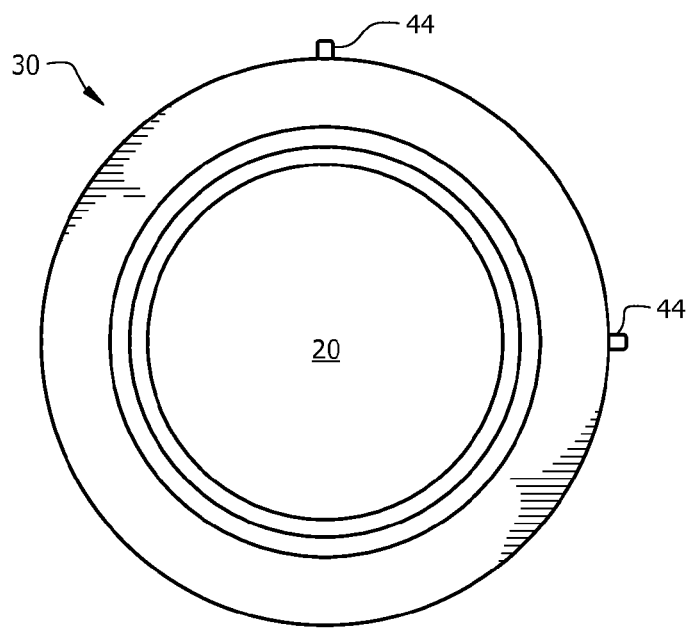
FIG. 5A is a top view of a bag cartridge used with a pet containment system.
Figure 5B:
FIG. 5B is a side outer view of the bag cartridge of FIG. 5A.
Figure 5C:
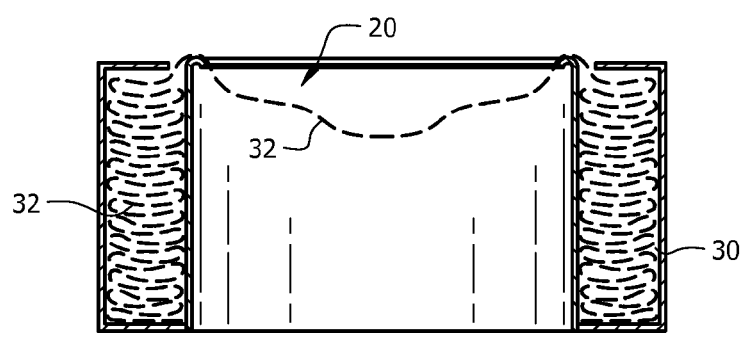
FIG. 5C is a cross-sectional view of the bag cartridge of FIG. 5A, said view indicating how the bags are attached and disposed within the reservoir.

FIGS. 5A-5C depict various views of bag cartridge 30 that can be utilized within system 10. FIG. 5A depicts a top view of bag cartridge 30 showing the annular configuration of bag cartridge 30 about the outer circumference of aperture 20. FIG. 5B depicts an outer side view of bag cartridge 30, and FIG. 5C depicts a side cross-sectional view of bag cartridge 30 showing bagging 32 disposed within cartridge 30 and bagging 32 being disposed into aperture 20. Bagging 32 can be arranged within bag cartridge in any suitable manner, for example by folds, scrunching, layering, etc., as bagging 32 comprises a single annular bagging lining that can be any length, for example 100 feet. Thus, bagging 32 contained in bag cartridge 34 is the same as bagging 32 traversing rollers 34 and as bagging 32 wound around spool 40.

The methodology behind use of system 10 is now disclosed. A feline or other animal would squat or sit above aperture 20 of system 10 and deposit waste into aperture 20. Upon conducting this action, the animal typically would depart from system 10. System 10 includes conventional motion sensor 42 that indicates the presence or absence of a pet on top of system 10, with or without upper lid 22, proximal to aperture 20. Motion sensor 42 may use any physical mechanism or electronic sensor that quantifies motion, or lack thereof, on system 10. A delay timer 50 may also be included such that upon a pet's departure from system 10, a predetermined amount of time lapses prior to automatic actuation of system 10.

Pet waste may be deposited within aperture 20 and rest on the compressed portion of bagging 32 atop tube 26b. When rollers 34 are activated (i.e., via motion sensor 42 communicating departure of the pet), first roller 34a rotates in a clockwise or counterclockwise direction, second roller 34b rotates in an opposite clockwise or counterclockwise direction, and spool 40 rotates. During this rotation, bagging 32 traverses rollers 34 via the passageway between first roller 34a and a wall of tube 26b, the passageway between first roller 34a and second roller 34b, and the passageway between second roller 34b and an opposite wall of tube 26b. Traversing rollers 34 allows bagging 32 to become sealed or secure on all sides of the deposited pet waste. Though only two rollers are depicted in the current figures, any number of rollers, preferably two or more, can be present.

Upon traversing the passageway between second roller 34b and the opposite wall of tube 26b, bagging 32 containing the pet waste is directed to spool 40 via any flange, frame, or force (e.g., gravity), dependent on the placement of spool 40. Bagging 32 containing the pet waste winds around spool 40 and can remain secured around spool 40 until there is no longer sufficient amount of bagging 32 in cartridge 30. At that point, bag cartridge 30 can be replaced with a new bag cartridge containing new bagging in system 10.

Figure 6:
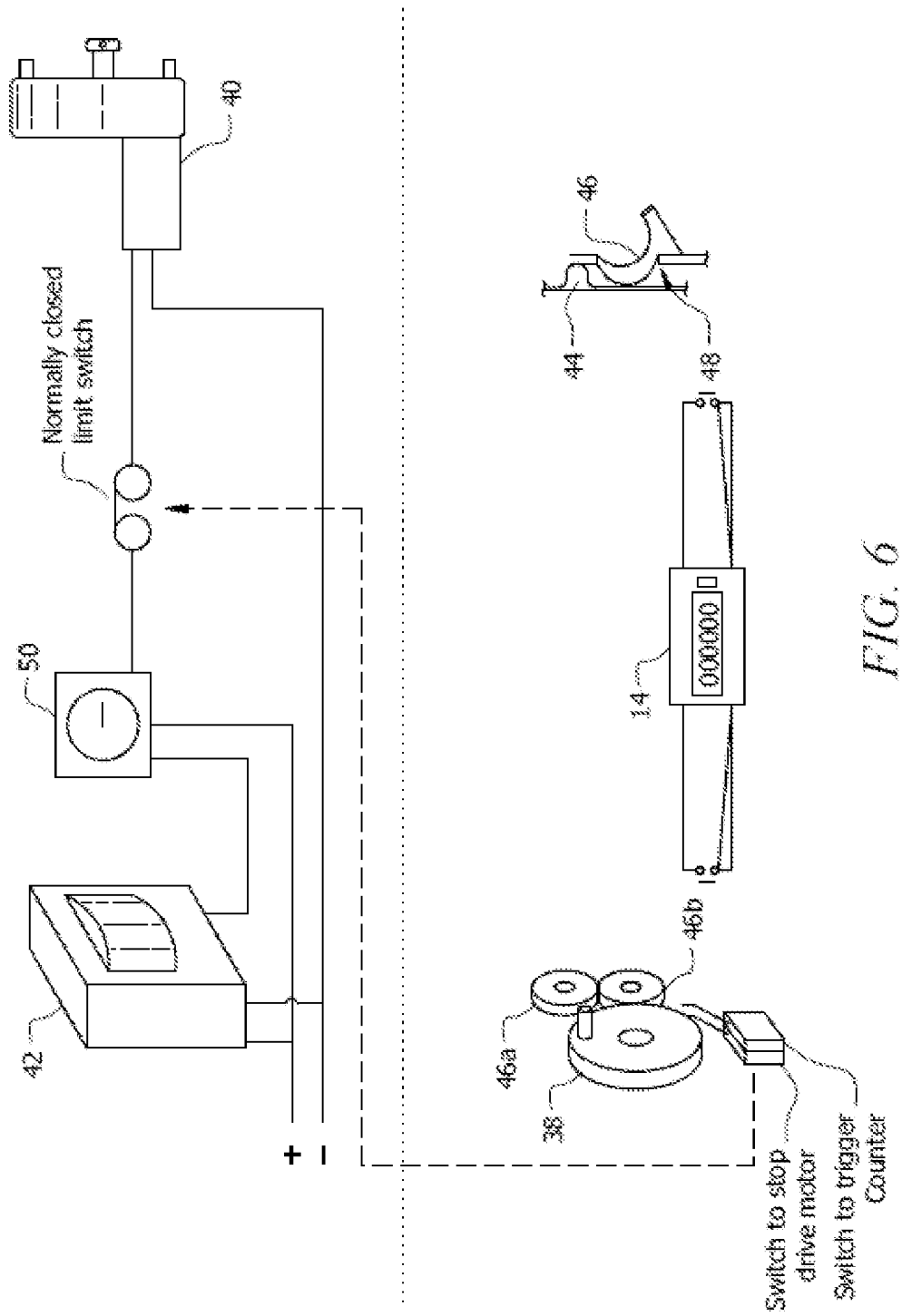
FIG. 6 is a circuit diagram for a motion sensor time delay feed system and feed distance shut off (above the dotted line) and counter control and reset method battery powered counter none voltage switching (below the dotted line), wherein installation of a new bag cartridge resets the counter.
Figure 7:
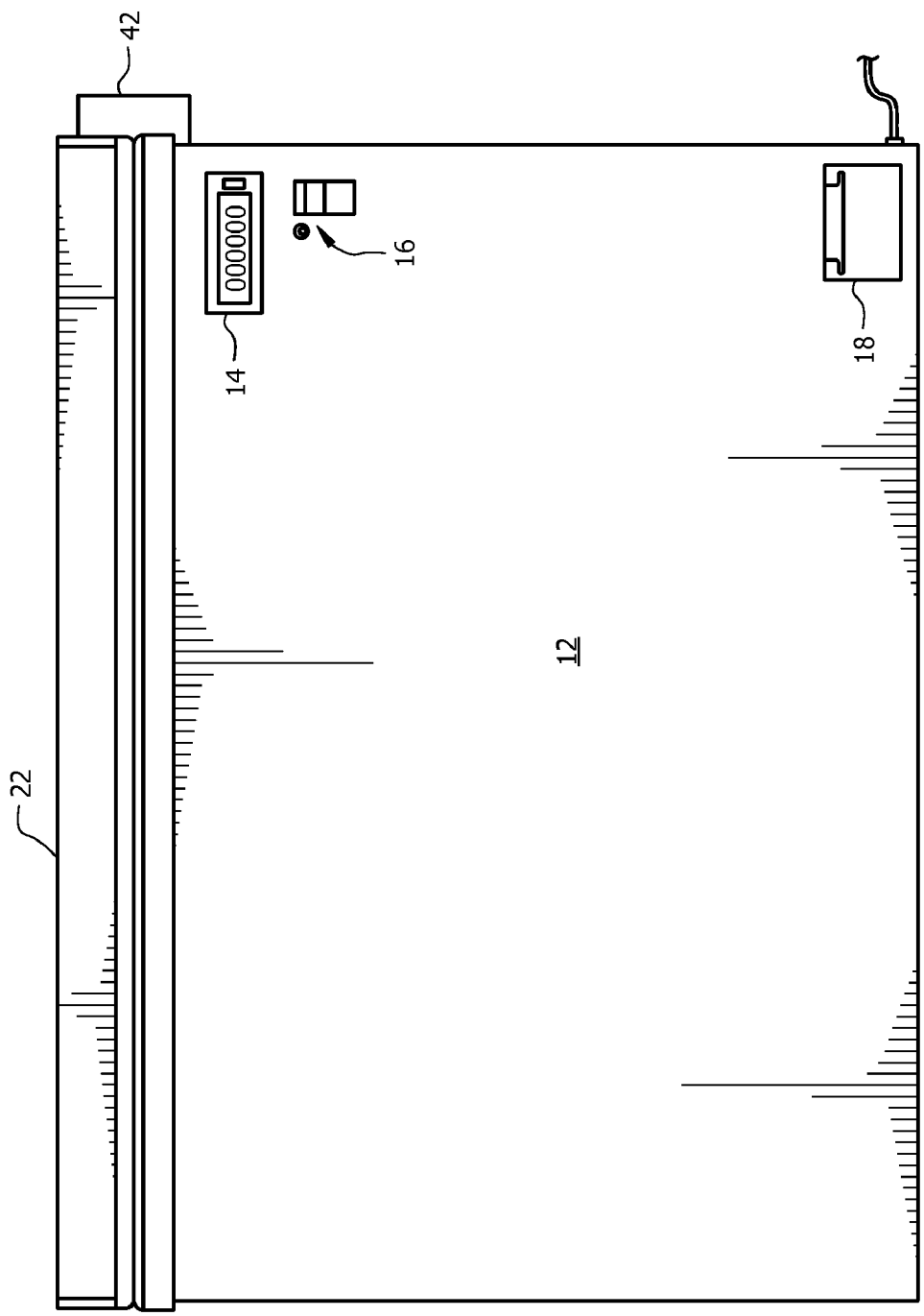
FIG. 7 is a front view of the exterior of a pet containment system.

FIG. 7 is a front view of the exterior of system 10 depicting frame 12, upper lid 22, power docking port 18, power indicator 16, and digital counter 14. Digital counter 14 measures and indicates the number of units of bagging 32 remaining in bag cartridge 30. Units may include U.S. units (e.g., feet, inches, etc.) or metric units. There may be any length of bagging 32 within cartridge 30, for example up to hundreds of feet. When bag cartridge 30 is replaced, the new cartridge containing new bagging includes one or more reset lugs 44, as depicted in FIG. 5A, that contacts reset contact switch 46 and triggers reset contact switch 46, as depicted in FIG. 6, to reset digital counter 14. To accommodate this, a notch 48 may be disposed within bag cartridge slot 30' (FIG. 4) with reset contact switch 46 disposed within notch 48. Bag cartridge 30 can be inserted into bag cartridge slot 30a such that reset lug 44 contacts and traverses switch 46 to reset digital counter 14. FIG. 6 is an exemplary circuit diagram depicting the mechanism by which motion sensor 42, the delay timer 50, spool 40, rollers 34, digital counter 14, reset lug 44, and reset contact switch 46 work in unison to control the methodology by which a user would know how much length is remaining in bagging 32. Delay timer 50 may function with digital counter 14 by counting one (1) unit of bagging 32 per two rotations of the rollers 34, or one count per rotation of spool 40. In another example, the last several feet of bagging 32 may contain a different color to provide an indication to the user that a new bag cartridge will be needed shortly. Any means of indicating to the user when a new bag cartridge is needed or how much bagging 32 is remaining can be used in system 10.

Figure 8A:
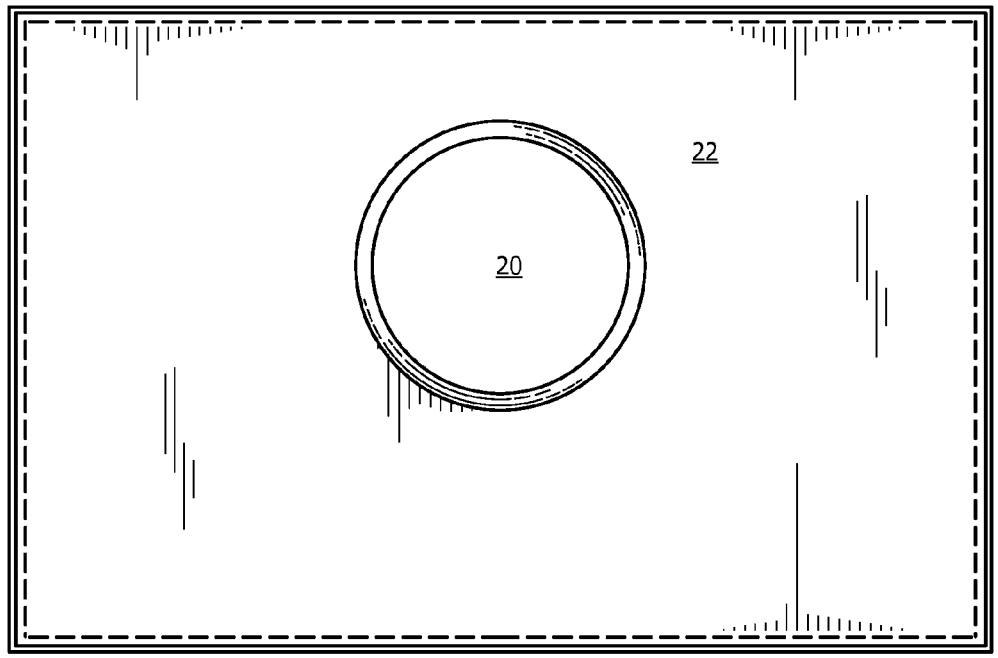
FIG. 8A is a top view of an upper lid used with a pet containment system.
Figure 8B:
FIG. 8B is a side view of the upper lid of FIG. 8A.

FIGS. 8A-8B are top and side views, respectively, of upper lid 22, which can be placed atop system 10. Upper lid 22 also has aperture 20 that aligns with aperture 20 of system 10 for training purposes. Litter (not shown) can line the horizontal surface of upper lid 22 up to the edge of aperture 20.

Figure 9A:
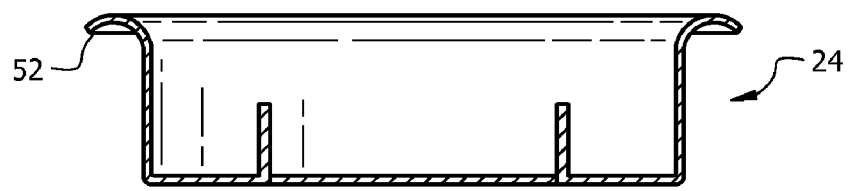
FIG. 9A is a cross-section of a tray insert used with a pet containment system.
Figure 9B:
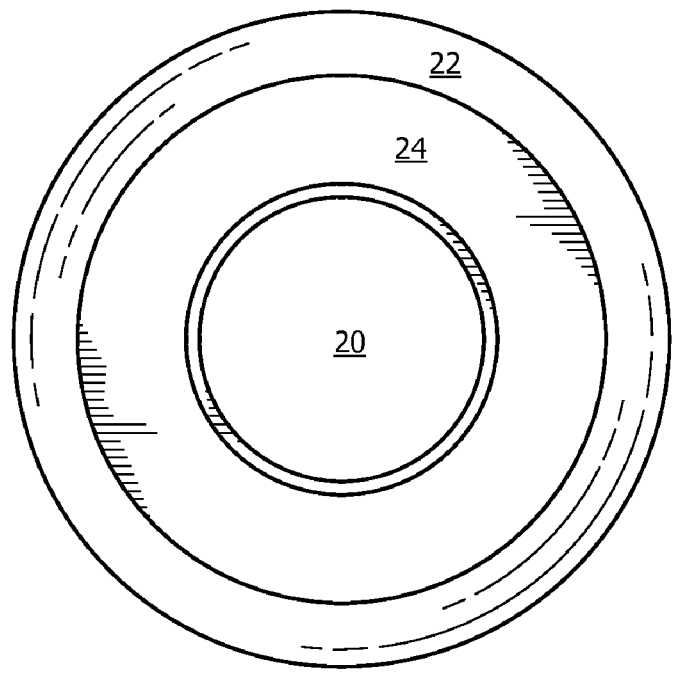
FIG. 9B is a top view of the tray insert of FIG. 9A.
Figure 9C:
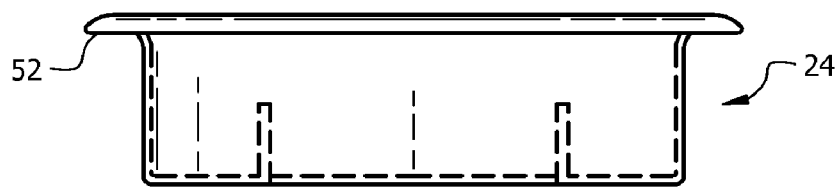
FIG. 9C is an outer side view of the tray insert of FIG. 9A.

FIGS. 9A-9C are cross-sectional, top, and exterior side views of tray insert 24, which can hang or be placed within aperture 20 for training purposes. Tray insert 24 can include a horizontal base, annular wall extending vertically therefrom, and annular horizontal overhang 52 extending outwardly therefrom. The overhang 52 can be disposed along the top surface of system 10 or upper lid 22 to allow tray insert 24 to hang within aperture 20. Tray insert 24 may also be filled or lined with litter (not shown).

A feline typically may need to be trained to use system 10 for its excretory needs. Thus, upper lid 22 and tray insert 24 can be included with system 10 individually or in combination. Lid 22 can be placed atop system 10, as seen in FIG. 1, and lined with litter. Insert 24 can be hung or placed within aperture 20 and lined with litter. Thus, a feline believes that system 10 is the proper area for depositing waste. When the feline becomes accustomed to utilizing this area, tray insert 24 may be removed so that upper lid 22 is still lined with litter, but the feline continues to deposit waste in aperture 20. When the feline becomes accustomed to this, litter may be gradually reduced until no litter is remaining The feline then has been trained to deposit waste into aperture 20 without any litter being present, and litter is no longer needed for feline pet waste.

DEFINITION OF CLAIM TERMS

Annular: This term is used herein to refer to any object or space having a ring or circular shape.

Aperture: This term is used herein to refer to an opening or open space in a surface, said opening capable of leading to a passageway.

Bag cartridge: This term is used herein to refer to a prefabricated subassembly that can be installed or removed from a larger mechanism or component, such as a housing, or be replaced with another interchangeable subassembly of this kind A "bag cartridge" can contain a lengthy amount of bagging or bag lining.

Bag lining: This term is used herein to refer to any thin flexible covering that is cable of securing pet waste while being manipulated and constrained to a line of path through the mechanics of the current invention. The "bag lining" may be made of any suitable material, such as cloth, paper, plastic, conventional garbage bag material, etc.

Cartridge slot: This term is used herein to refer to a reservoir capable of receiving a bag cartridge.

Circular rotating spool: This term is used herein to refer to a collection duct that rotates in manner that allows bagging or lining to wind in a secure and tight fashion. Bagging may contain pet waste or may not contain pet waste, dependent on the portion of the bagging being wound, but the "spool" must allow secure winding until replacement of the bagging is needed.

Counter trigger gear: This term is used herein to refer to a wheel that rotates and actuates the rotation of another gear through the use of teeth along is outer surface or other known means.

Delay timer: This term is used herein to refer to an electrical device that retards an electrical signal from being transmitted from the motion sensor to the rollers for a predetermined amount of time. Thus, if the predetermined amount of time is five seconds, for example, the "delay timer" can retard the electrical signal from reaching the rollers for five seconds. Any conventional delay timer can be used in the current invention.

Diameter: This term is used herein to refer to the length of any straight line between two points on the circumference of a circular object or space and passing through the center of the circle.

Digital counter: This term is used herein to refer to a conventional electronic device that has a variable or memory location that is capable to increment particular contents to keep count of those contents. For example, a "digital counter" is capable of keeping count of the length of bag lining remaining in the bag cartridge. The digital counter may be reset when the bag cartridge is replaced.

Electrical communication: This term is used herein to refer to a connection between the electrical circuit of one device and the electrical circuit of another device, over which electrical information can be transmitted between the two devices, particularly from the first device to the second device.

Funnel-shaped structure: This term is used herein to refer to an object that has the shape of a funnel, including a cup portion leading to a tubing portion. Thus, the cup portion has a diameter that is larger than the tubing portion, which can contain mechanical devices, such as rollers.

Gear: This term is used herein to refer to a wheel that rotates and actuates the rotation of another object, such as a roller.

Gibbous: This term is used herein to refer to a shape that is characterized by convexity or protuberance. For example, a "gibbous" shape may be a phase between circular and half-circular with the 'incomplete' edge being convex.

Housing: This term is used herein to refer to a mechanical component's container frame or covering. A "housing" covers and protects the structures in the interior of the housing. In the current invention, the housing contains and protects at least some of the mechanical components that allow the bagging to secure the pet waste.

Leading edge: This term is used herein to refer to the edge of the bag lining that is initially released from the bag cartridge into the aperture and is the first edge to contact the circular rotating spool.

Motion sensor: This term is used herein to refer to a device that detects a change in position of an object relative to its surroundings or a change in the surroundings relative to the object. Any conventional "motion sensor" can be used in the current invention, as the sensor can detect whether a feline has departed from the system and transmit an electrical signal indicating such detection.

Outer circumference: This term is used herein to refer to the outside of a circular object or space. For example, if a reservoir is disposed along the "outer circumference" of an aperture, the reservoir follows the shape of the aperture outside of its circumference.

Pet waste: This term is used herein to refer to any excrement (e.g., solid, liquid) expelled from an animal.

Predetermined amount of time: This term is used herein to refer to a time period that has been preset prior to which a feline departs from the system and after which the rollers are actuated to secure the waste and proceed through winding about the rotating spool.

Proximity: This term is used herein to refer to the state of two objects being close or near in space to one another. In the current invention, the circular rotating spool can be positioned in "proximity" to the rollers to allow bagging to remain taut and wind around said spool.

Reset lug: This term is used herein to refer to an extension from the side of the bag cartridge that contacts the reset switch when the bag cartridge is placed into the cartridge slot. This contact facilitates the transmission of an electrical signal to the digital counter to reset the counter.

Reset switch: This term is used herein to refer to a component within the cartridge slot that lines up to the reset lug of a bag cartridge when the bag cartridge is inserted into the cartridge slot. Contact between the reset lug and reset switch facilitates the transmission of an electrical signal to the digital counter to reset the counter.

Roller: This term is used herein to refer to any rotating device that is part of a machine. A "roller" may take on any shape, such as a cylindrical shape or gibbous shape.

Rounded portion: This term is used herein to refer to complete or circular portion of a gibbous-shaped object. In other words, the "rounded portion" is the portion of the object opposite from the incomplete or convex portion.

Substantial alignment: This term is used herein to refer to the arrangement of the apertures of the upper lid and housing in a line to provide a single opening into which a pet may deposit its waste.

Sufficient contact: This term is used herein to refer to the contact between the reset lug reset switch. The contact must be "sufficient" to allow the reset switch to transmit an electrical signal to the digital counter to reset the counter.

Tangential contact: This term is used herein to refer to the light, peripheral or incidental touching of two objects. For example, if a roller and a wall of tubing have "tangential contact", they touch lightly to create friction but do not exert any excessive pressure on one another.

Trailing edge: This term is used herein to refer to the edge of the bag lining that is directly opposite the leading edge.

Tray insert: This term is used herein to refer to an object with flat rigid base that hangs within the aperture of the housing. Litter may be spread across the surface of the tray insert base, for the purpose of training a feline to use the pet waste containment system for its excretory needs.

Tubing: This term is used herein to refer to a flexible or inflexible tube or pipe that is hollow and is capable of containing mechanical devices. For example, a "tubing" may belong to a hollow-shaped structure and contain one or more rollers and bagging that traverses the rollers.

Upper lid: This term is used herein to refer to a planar surface with an aperture therewithin and raised edges that can be placed atop the housing of the current invention. The aperture of the upper lid aligns with the aperture of the housing to allow pet waste to drop into the interior of the housing. Litter may be spread across the surface of the upper lid as well, for the purpose of training a feline to use the pet waste containment system for its excretory needs. Removing the upper lid can reveal the interior of the housing.

Vertical inner wall: This term is used herein to refer to the side of the bag cartridge forming the inner circumference of the bag cartridge. The entire surface of that side forms the "vertical inner wall".

Wall: This term is used herein to refer to a structure that acts as a division within a structure. For example, the "wall" of the tubing in the current invention divides the interior of the tubing, which contains the rollers, from the exterior of the tubing. Though the tubing may be circular or other shape, it may contain several "walls" as an opposite wall is the one directly across from the referenced wall.

It will thus be seen that the objects set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A pet waste containment system, comprising:
    a housing including a top side, bottom side, left side, right side, front side, and back side;
    an aperture disposed in the top side of said housing;
    a bag cartridge disposed within a cartridge slot along an outer circumference of said aperture, an inner diameter of said cartridge slot being greater than a diameter of said aperture, said bag cartridge containing an annular bag lining displaced into said aperture, said lining having a leading edge and a trailing edge, said leading edge and said trailing edge being connected by the remainder of said lining;
    an annular wall disposed in underlying relation to said aperture;
    a tubing disposed in proximity to said annular wall, said tubing having a diameter smaller than a diameter of said aperture, said bag lining directed along said annular wall from said aperture into the interior of said tubing;
    at least one roller disposed within the interior of said tubing, said at least one roller having a gibbous shape, said bag lining constrained to follow a path of travel through said at least one roller via rotation of said at least one roller; and
    a circular rotating spool disposed in proximity to said at least one roller, said bag lining constrained to being wound around said spool after following the path of travel.

2. A pet waste containment system as in claim 1, further comprising:
    a digital counter displayed on an exterior surface of said housing, said digital counter indicating a length of bag lining remaining in said bag cartridge;
    at least one reset lug extending from said bag cartridge; and
    at least one reset switch disposed within the interior of said cartridge slot, wherein placement or removal of said bag cartridge into said cartridge slot allows said at least one reset lug and said at least one reset switch to come into sufficient contact to transmit an electrical signal resetting said digital counter.

3. A pet waste containment system as in claim 1, further comprising:
    an upper lid disposed in overlying relation to said top side of said housing; and
    an additional aperture formed in said upper lid, said additional aperture and said aperture being in substantial alignment with one another.

4. A pet waste containment system as in claim 1, further comprising:
    a tray insert disposed within said aperture, said tray insert having a base that lies below said aperture and having a diameter similar to a diameter of said aperture.

5. A pet waste containment system as in claim 1, further comprising:
    said bag lining contained within said bag cartridge, said bag lining folded into layers within said bag cartridge.

6. A pet waste containment system as in claim 1, further comprising:
    a funnel-shaped structure disposed in underlying relation to said aperture, a cup of said funnel-shaped structure used to constrain said bag lining to said path of travel.

7. A pet waste containment system as in claim 1, further comprising:
    a vertical inner wall of said bag cartridge forming said annular wall.

8. A pet waste containment system as in claim 1, further comprising:
    at least one gear coupled and corresponding to said at least one roller to drive rotation of said at least one roller.

9. A pet waste containment system as in claim 8, further comprising:
    at least one counter trigger gear interlocked with said at least one gear to drive rotation of said at least one gear.

10. A pet waste containment system as in claim 1, further comprising:
    each roller of said at least one roller having a rounded portion in tangential contact with a wall of said tubing, said contact providing friction between said each roller and said wall.

11. A pet waste containment system as in claim 1, further comprising:
    a motion sensor disposed along the top side of said housing, said motion sensor in electrical communication with said at least one roller,
    a delay timer disposed in electrical communication with said motion sensor and said at least one roller, such that when said pet departs from said system, said delay timer delays sending an electrical signal for a predetermined amount of time from said motion sensor to said at least one roller to actuate said at least one roller.

12. A pet waste containment system, comprising:
a housing including a top side, bottom side, left side, right side, front side, and back side;
a first aperture disposed in the top side of said housing;
a bag cartridge disposed within a cartridge slot along an outer circumference of said first aperture, an inner diameter of said cartridge slot being greater than a diameter of said first aperture, said bag cartridge containing an annular bag lining displaced into said first aperture, said bag lining folded into layers within said bag cartridge, said lining having a leading edge and a trailing edge, said leading edge and said trailing edge being connected by a remainder of said lining;
said bag cartridge including a vertical inner wall that forms an annular wall disposed in underlying relation to said first aperture;
a funnel-shaped structure disposed in underlying relation to said first aperture and said bag cartridge, said funnel-shaped structure including a cup and a tubing, said cup of said funnel used to direct said bag lining into said tubing, said tubing having a circumference smaller than a circumference of said first aperture, said bag lining directed along said annular wall from said first aperture into the interior of said tubing;
at least one roller disposed within the interior of said tubing, said at least one roller having a gibbous shape, said bag lining constrained to follow a path of travel through said at least one roller via rotation of said at least one roller;
at least one gear coupled and corresponding to said at least one roller to drive rotation of said at least one roller;
at least one counter trigger gear interlocked to said at least one gear to drive rotation of said at least one gear;
each roller of said at least one roller having a rounded portion in tangential contact with a wall of said tubing, said contact providing friction between said each roller and said wall;
a circular rotating spool disposed in proximity to said at least one roller, said bag lining directed to and being wound around said spool after following the path of travel;
a digital counter displayed on an exterior surface of said housing, said digital counter indicating a length of bag lining remaining in said bag cartridge;
at least one reset lug extending from said bag cartridge;
at least one reset switch disposed within an interior of said cartridge slot, wherein placement or removal of said bag cartridge into said cartridge slot allows said at least one reset lug and said at least one reset switch to come into sufficient contact to electrically transmit a signal resetting said digital counter;
an upper lid disposed in overlying relation to said top side of said housing; and
a second aperture formed in said upper lid, said second aperture and said first aperture being in substantial alignment with one another; and
a tray insert disposed within said first aperture, said tray insert having a base that lies below said first aperture and having a diameter similar to a diameter of said first aperture.

* * * * *